United States Patent [19]

Johnson et al.

[11] Patent Number: 4,956,770

[45] Date of Patent: Sep. 11, 1990

[54] METHOD AND DEVICE TO EXECUTE TWO INSTRUCTION SEQUENCES IN AN ORDER DETERMINED IN ADVANCE

[75] Inventors: Sten E. Johnson, Huddinge; Lars-Örjan Kling, Södertälje, both of Sweden

[73] Assignee: Telefonaktiebolaget L M Ericsson, Stockholm, Sweden

[21] Appl. No.: 197,410

[22] PCT Filed: Sep. 28, 1987

[86] PCT No.: PCT/SE87/00437

§ 371 Date: May 17, 1988

§ 102(e) Date: May 17, 1988

[87] PCT Pub. No.: WO88/02513

PCT Pub. Date: Apr. 7, 1988

[30] Foreign Application Priority Data

Oct. 3, 1986 [SE] Sweden ................ 8604223

[51] Int. Cl.⁵ ................................ G06F 9/30
[52] U.S. Cl. ......................... 364/200; 364/262.8; 364/263; 364/263.1; 364/239.4
[58] Field of Search ... 364/200 MS File, 900 MS File, 364/740, 741

[56] References Cited

U.S. PATENT DOCUMENTS

| | | | |
|---|---|---|---|
| 3,787,673 | 1/1974 | Watson et al. | 235/156 |
| 3,967,248 | 6/1976 | Kjoller et al. | 364/200 |
| 3,969,702 | 7/1976 | Tessera | 364/200 |
| 4,075,694 | 2/1978 | Ericsson | 364/200 |
| 4,466,061 | 8/1984 | DeSantis et al. | 34/200 |
| 4,626,989 | 12/1986 | Torii | 364/200 |
| 4,674,037 | 6/1987 | Funabashi et al. | 364/200 |
| 4,720,779 | 1/1988 | Reynard et al. | 364/200 |
| 4,841,432 | 6/1989 | Kishi et al. | 364/191 |

FOREIGN PATENT DOCUMENTS

1218656 3/1968 United Kingdom .
1441458 6/1978 United Kingdom .

OTHER PUBLICATIONS

Granberg, "APZ 150: A Multiprocessor System for the Control of Transit Telephone Exchanges", Telefonakiebolaget, 1976, pp. 287-306.
Intel "APX 286 Hardware Reference Manual", vol. 2, pp. 1-3, vol. 3, pp. 56-57.
"Balance 8000 Technical Summary", Chapter 1-Introduction pp. 1-17, Dated Dec. 11, 1985.
"Backup Support Gives VME Bus Powerful Multi-Processing Architecture", Electronics, Mar. 22, 1984, pp. 132-138.
"Supercomputer Expands Parallel Processing Options", Computer Design, Aug. 15, 1985, pp. 76-81.

*Primary Examiner*—Gareth D. Shaw
*Assistant Examiner*—Christine M. Eakman
*Attorney, Agent, or Firm*—Burns, Doane, Swecker & Mathis

[57] ABSTRACT

A data processing system which executes two instruction sequences in an order determined in advance. With the aid of instructions, a main memory common to both sequences is activated for data information reading/writing. Increased data handling capacity is achieved in the following manner: both sequences are executed in parallel to start with. During execution of the first sequence, the main memory is prevented from being activated for writing due to the second sequence write instructions. A write address and data information included in a write instruction associated with the second sequence are intermediately stored. The intermediately stored write address is compared with the read addresses of the second sequence, and data information is prevented from being read from the main memory in response to an identity of the addresses, the intermediately stored data information being read instead. An address included in a read instruction associated with the second sequence is intermediately stored if this address has not been previously selected in conjuction with a write instruction associated with the second sequence. The intermediately stored read address is compared with the write address of the first sequence and execution of the second sequence is restarted in response to an identity of the addresses.

2 Claims, 3 Drawing Sheets

METHOD AND DEVICE TO EXECUTE TWO INSTRUCTION SEQUENCES IN AN ORDER DETERMINED IN ADVANCE

TECHNICAL FIELD

The present invention relates to a method and a device for executed two instruction sequences in an order determined in advance, the executions including selection of read instructions each containing a read address for retrieval of data information stored in one of a plurality of main memory locations accessible by their individual adresses, as well as selection of write instructions each containing a write address and data information, for transferring this data information to a main memory location accessible by this write address and wherein the data information used in conjunction with the execution of the sequence which is second according to determined order, not being guaranteed in advance to be independent of the data information obtained in conjunction with the execution of the sequence which is first according to the determined order.

BACKGROUND ART

A trivial, conventional solution of the above mentioned information handling problem resides in that the execution of the second sequence is not started until the execution of the first sequence is terminated. This trivial solution is obtained as a natural necessity in a data processing system controlled by a single processor such that the sequences are executed one at a time using main memory locations common to both sequences.

It is known to increase data processing capacity by parallel execution of the instruction sequences. As long as the sequences are guaranteed in advance to be mutually independent, fault-free parallel operation is achieved with the aid of so-called pre-processing or multi-processing, or also with the aid of a one-processor system which includes at least two data processing units, each of which executes its instruction sequence. It is known to realize information handling both by means of a main memory which is common to a plurality of data processing units and by means of a plurality of separate memories each associated with its data processing unit and mutually updated from time to time.

When there are sensitive instruction sequences which affect each other, and which must therefore be executed in a prescribed order, e.g., according to the journal Computer Design, Aug. 15, 1985, pp 76–81, or "Balance 8000 System Technical Summary, Sequent Computer Systems, Inc", programming languages, compilers and sequence hardware for parallel processing of mutually independent sequences, are used while parallel processing of the sensitive sequences is prevented.

SUMMARY OF THE INVENTION

As already mentioned in the introduction, the present invention relates to data information processing while using a main memory common to both sequences. In the proposed information processing, both sequences are executed in parallel without having to take notice of the predetermined order of execution. To ensure the predetermined order it is, however, necessary to prevent data information obtained from selected write instructions associated with the second sequence from being transferred to the main memory locations during the preceding execution of the first sequence. The dependence of the second sequence on the first sequence is monitored and the prescribed order is achieved with the aid of an intermediate storage unit which includes an auxiliary memory and comparison circuits.

Addresses obtained due to read instructions selected during execution of the second sequence are intermediately stored in the auxiliary memory. Every write address selected during the execution of the first sequence is compared with each of the read addresses stored in the auxiliary memory. As long as no addresses are determined to be the same, no data information dependent on data information obtained during the execution of the first sequence is used during the execution of the second sequence. If during execution of the second sequence information is retrieved from a main memory location, and this information is then corrected due to a write operation associated with the first sequence, i.e., if the two sequences are no longer mutually independent, the auxiliary memory is erased and the instruction selections of the second sequence are started once again. Restarting execution of the second sequence then takes place at a time when a first part of the first sequence has already been executed, and consequently there is less risk of the second sequence being dependent on the remaining part of the first sequence.

Write addresses and data information obtained on the basis of write instructions selected during execution of the second sequence are also stored in the auxiliary memory. Every read address selected during execution of the second sequence is compared with each of the write addresses intermediately stored in the auxiliary memory. Should no addresses then be determined to be the same data information is retrieved from the main memory location which is accessible with the aid of the read address in question, while data information assigned to the address in question is retrieved from the auxiliary memory if the addresses are ascertained to be the same.

When the execution of the first sequence is terminated, the data information intermediately stored in the auxiliary memory is transferred to the main memory locations which are accessible by the likewise intermediately stored associated write addresses.

In using the proposed information handling, an increase in the data processing capacity is obtained, if the execution of the second sequence is independent of at least the instructions selected at the execution termination of the first sequence. The increased capacity is further improved if a selected address is intermediately stored as a read address in the auxiliary memory solely if this address has not been present as a write address earlier during execution of the second sequence.

The characterizing features of the invention are apparent from the claims.

BRIEF DESCRIPTION OF DRAWINGS

The invention will now be described in detail below and with reference to the accompanying drawing in which.

DETAILED DESCRIPTION OF A MODE FOR CARRYING OUT THE INVENTION

Figure 1:
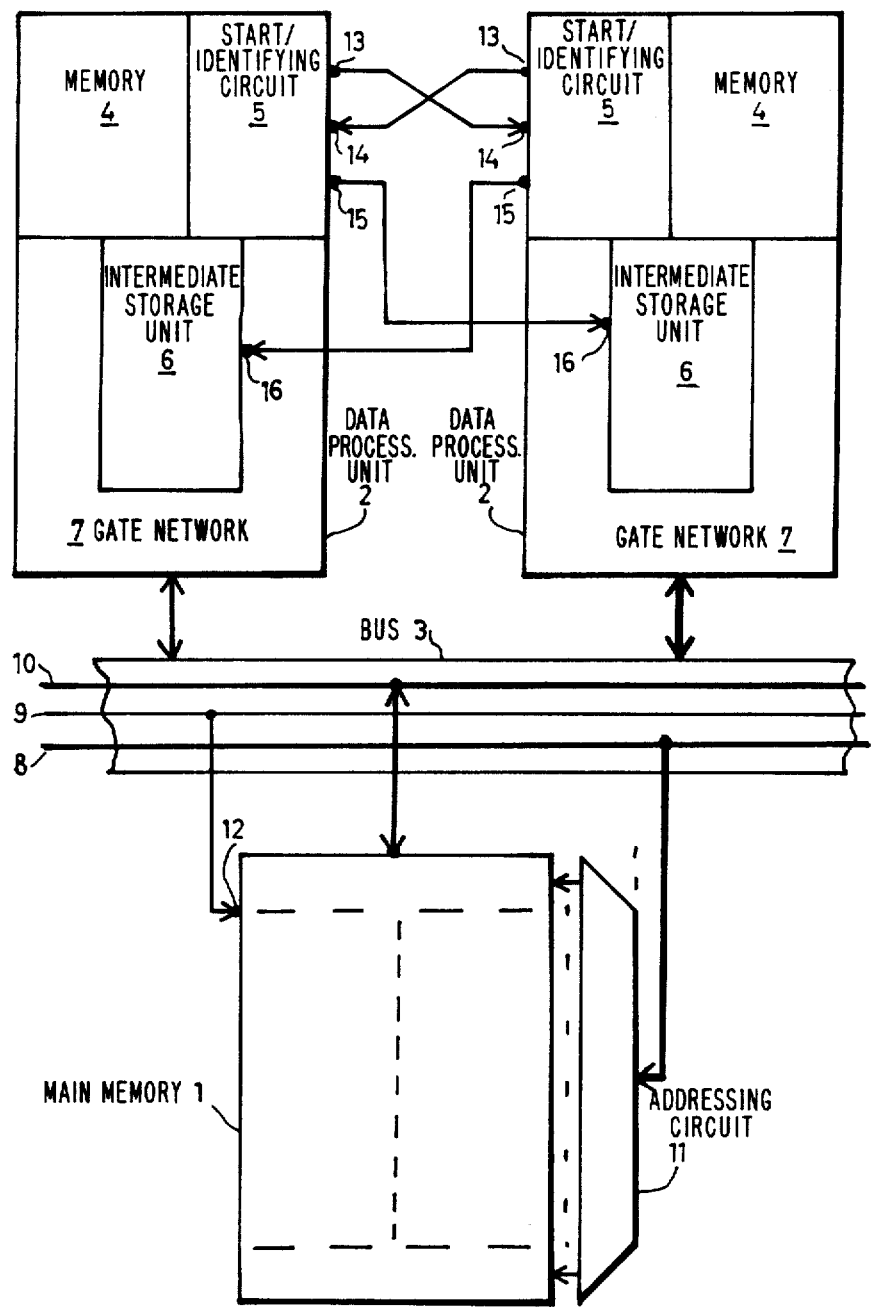
FIG. 1 illustrates two data processing units connected via a bus system to a common main memory.

A data processing system according to FIG. 1 includes a main memory 1 for storing data information, processed by at least two data processing units 2, which, via a bus system 3, are each connected to the main memory. Each of the data processing units executes an instruction sequence for controlling assigned functional units (not illustrated in FIG. 1) in carrying out assigned system functions. Depending on whether the data processing units are controlled by a common processor or whether each unit includes a plurality of processors, there is conventionally obtained in principle a one- or multi-processor system, including a common bus and a common main memory. Such a data processing system including a plurality of data processing units and a bus is described, for example, in Intel's "APX" "286 Hardware Reference Manual" and the article "Backup Support gives VME bus powerful milti-processing architecture" in "Electronics" Mar. 22, 1984.

FIG. 1 illustrates in a greatly simplified way, taking into account the present invention, two data processing units 2 for executing the above mentioned first and second instruction sequences in an order determined in advance. Apart from a conventional instruction memory device 4 for selecting, one at a time, instructions stored in an instruction memory, each data processing unit includes a start/identifying circuit 5, for stating whether its own sequence is the first independent or the second possibly dependent sequence, and an intermediate storage unit 6 for intermediately storing addresses and data information included in the instructions, such data being, however, solely used in the data processing unit executing the second sequence, and finally a gate network 7 for controlling connection of the data processing unit to the bus system 3.

It will be understood from the later description that the bus system load is increased somewhat due to the required instruction intermediate storages, but it is assumed that the accessibility capacity of the bus system towards the data processing units and towards the main memory is such that the total data processing can be carried out without disturbance of the order which has been determined in advance. Of the bus system, FIG. 1 illustrates a multibit address bus 8, a line 9 for transferring write signals, and a multibit data bus 10. It is further indicated that the data bus is two-way connected to the main memory 1 and the data processing units 2, while the address bus 8 and write signal line 9 are one-way connected to an addressing circuit 11 and a write activation input 12 of the main memory, on which the reception of an address and a write signal cause the contents of the data bus to be transferred to a main memory location accessible by the address. On solely receiving an address, data is transferred from the main memory, this data being stored in a main memory location accessible by the address, via the data bus 10, to the data processing unit sending the address. The start identifying circuits 5 of the data processing units 2 are each provided with a starting signal output 13 which is connected to a starting signal input 14 on the other circuit 5. There is thus indicated the possibility of executing both sequences in parallel that is described hereinafter and used in the proposed information handling.

Finally, in FIG. 1 the start identifying circuits 5 are illustrated as being each provided with their identifying signal output 15, which is connected to a first identifying signal input of the intermediate storage unit 6 of the other data processing unit.

FIG. 1 does not show the conventional buffers and activations which are used and carried out in connection with the data transfers between the data processing units and the bus system. The bus system, as it will be described later, is also used for transferring addresses and write signals between the data processing units.

Figure 2:
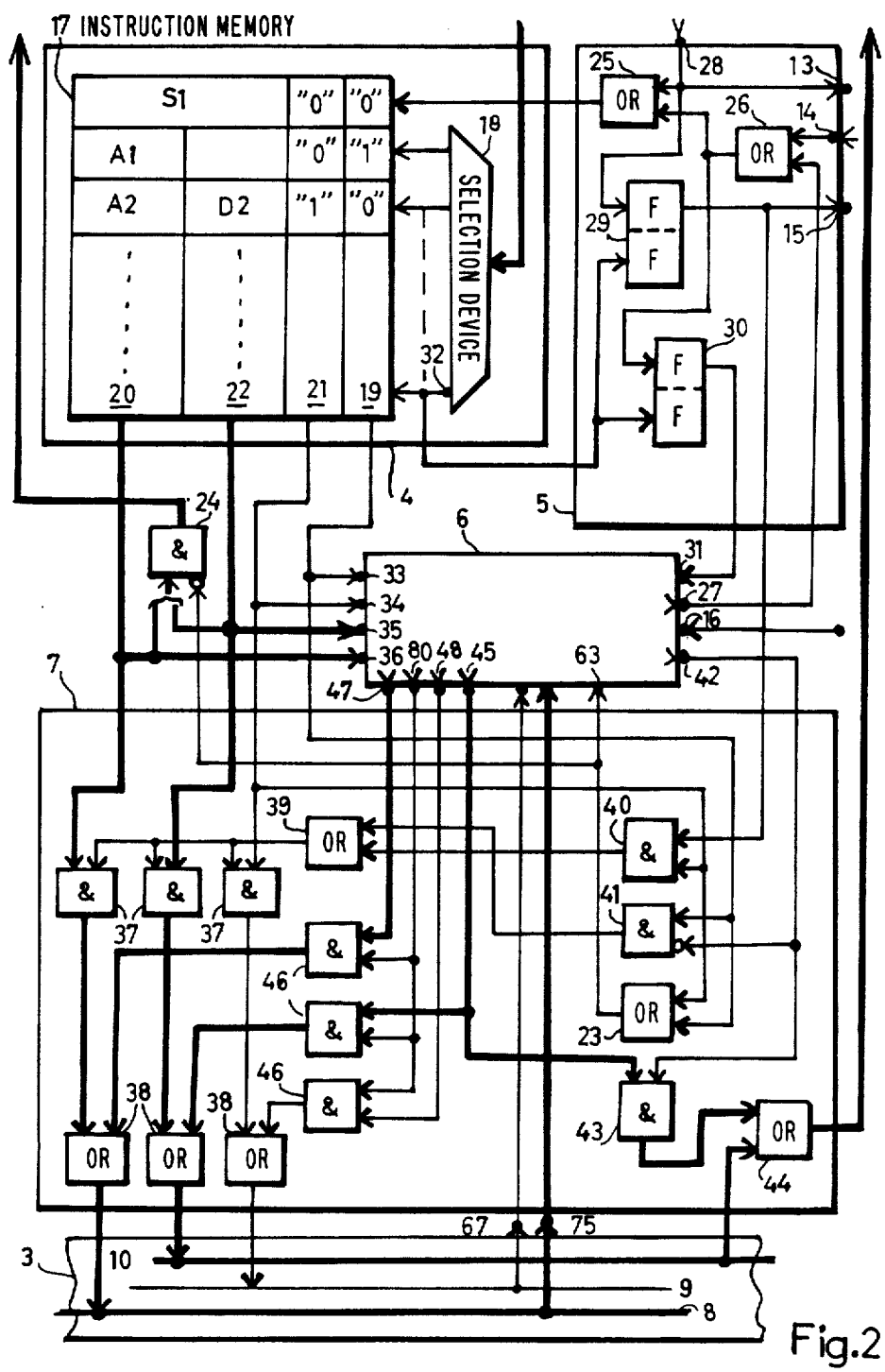
FIG. 2 illustrates in more detail than FIG. 1 an instruction memory device, a circuit for starting and identifying and a gate network, which are included in a data processing unit.

FIG. 2 illustrates in more detail than FIG. 1 some data processing unit details, knowledge of which is required for understanding the proposed information handling.

The instruction memory device 4 includes an instruction memory 17 for storing an instruction sequence, which is read out from the instruction memory, one instruction at a time with the aid of a selection device 18, due to activation by one of the selection device outputs.

The sequence includes three instruction types. The first type, hereinafter designated "read instruction", which is identified by a binary ONE set read bit position 19, is used for ordering the retrieval of data from a main memory location, to which access is obtained with the aid of an address, e.g. A1, stored in a number of address bit positions 20, the address being included in the read bit marked instruction. The second instruction type, hereinafter designated "write instruction", which is identified by a ONE set write bit position 21, is used for ordering that data, e.g. D2, be written into a main memory location, this data being included in the write bit marked instruction and stored in a number of data bit positions 22, while using an address, e.g. A2, which is also included in the write bit marked instruction and stored in the address bit positions 20. The third instruction type, which is identified by ZERO set bit positions 19 and 21, is used for ordering information handling without reading from or writing into the main memory. The use of the information, e.g. S1, stored in the bit positions 20 and 22, which are associated with the third type of instruction, are not within the scope of the invention, but FIG. 2 illustrates a first OR gate 23, which is included in said gate network 7 and has its inputs connected to the bit positions 19 and 21 and its output connected to an inverting activating input of a first AND gate device 24, which in an activated state transfers the contents, e.g. S1, of the bit positions 20 and 22 directly to the data processing unit. Instructions of the third type do not load the bus system or the main memory, which may therefore be common to a plurality of data processing units without making too large speed demands on the main memory and bus system.

The start/identifying circuits 5 of the data processing units each include second and third OR gates 25 and 26, according to FIG. 2. Gate 25 has one of its inputs connected to the output of the gate 26, the inputs of which are connected to the above-mentioned starting signal input 14 and to a restarting signal output 27 of the intermediate storage unit 6 included in the same data processing unit. The data processing units each include a starting signal generator, not illustrated in FIG. 2, the output of which is connected via a starting terminal 28 to the other input of gate 25, to the above-mentioned starting signal output 13 and to the setting input of a first flipflop 29, with an output constituting the above-mentioned identifying signal output 15. A second flipflop 30 has its setting input connected to the output of gate 26 and its output connected to a second identifying signal input 31 on the local intermediate storage unit 6. In its activated state the gate 25 selects an instruction of the third type, which is a starting instruction with the contents S1, due to which the data processing unit starts the associated instruction sequence execution with the aid of its selection device 18. It is assumed that the sequence stored in the instruction memory 17 is terminated in conjunction with the activation of a selection device output 32, which is connected to the resetting inputs of the flipflops 29 and 30.

Execution of the first sequence is started by the local starting signal generator. Consequently, a binary ONE on the output of the first flipflop 29 indicates that the instruction selections associated with the local sequence are in progress and that the local sequence is the first sequence. A binary ONE on the output of the second flipflop 30 indicates that the instruction selections associated with the local sequence are in progress and that the local sequence is the second sequence. In accordance with the invention, the instructions of both sequences are selected in parallel, which is achieved, e.g., by means of a starting signal transfer from the starting signal output 13 associated with the first sequence to the starting signal input 14 associated with the second sequence.

The instructions selected from the instruction memory 17 are transferred to the gate network 7 of the data processing unit, and via terminals 33–36 to the intermediate storage unit 6 of the data processing unit. Each gate network 7 includes a second AND gate device 37 for transferring, when in an active state, via a first OR gate device 38, the contents of the bit positions 20–22 to the address bus 8, the write signal line 9 and the data bus 10 of the bus system. The gate device 37 has its activation input connected to the output of a fourth OR gate 39, the first and second inputs of which are respectively connected to the outputs of a first 40 and second control gate 41. The control gate 40 has its first input connected to the write bit position 21 of the instruction memory and its second input connected to the output of the first flipflop 29. The control gate 41 has its first input connected to the read bit position 19 of the instruction memory and its second inverting input connected to a category signal output 42 of the intermediate storage unit 6.

It is described later on that there is a first and a second category among the read instructions which are selected during the execution of the second sequence, that the first and second categories are respectively identified by a binary ZERO and ONE transferred via said category output 42, and that said category output 42 sends a binary ZERO if the associated data processing unit executes the first sequence. Consequently, the gate device 37 is activated due to all read instructions and write instructions which are selected during the execution of the first sequence, as well as due to a read instruction of the first category. However, the gate device 37 is not activated due to a third type of instruction or a write instruction which is selected during the execution of the second sequence or due to a read instruction of the second category.

Every gate network further includes a third AND gate device 43 for transferring in an active state via a second OR gate device 44 data information obtained from a terminal 45 in the intermediate storage unit 6, and which are processed by the associated data processing unit. The gate device 43 has its activating input connected to the category signal output 42. The OR gate device 44 has its second input connected to the data bus 10 of the bus system. When selecting a second category instruction, data information is thus not retrieved from the main memory 1 but from the intermediate storage unit 6.

Finally, every gate network 7 includes a fourth AND gate device 46 for transferring, in an activated state, data and address information as well as write signals from output terminals 45, 47 and 48 of the intermediate storage unit 6 associated with the same data processing unit to the bus system 3. Activation of the gate device 46 will be described in conjunction with the description of the intermediate storage unit.

Figure 3:
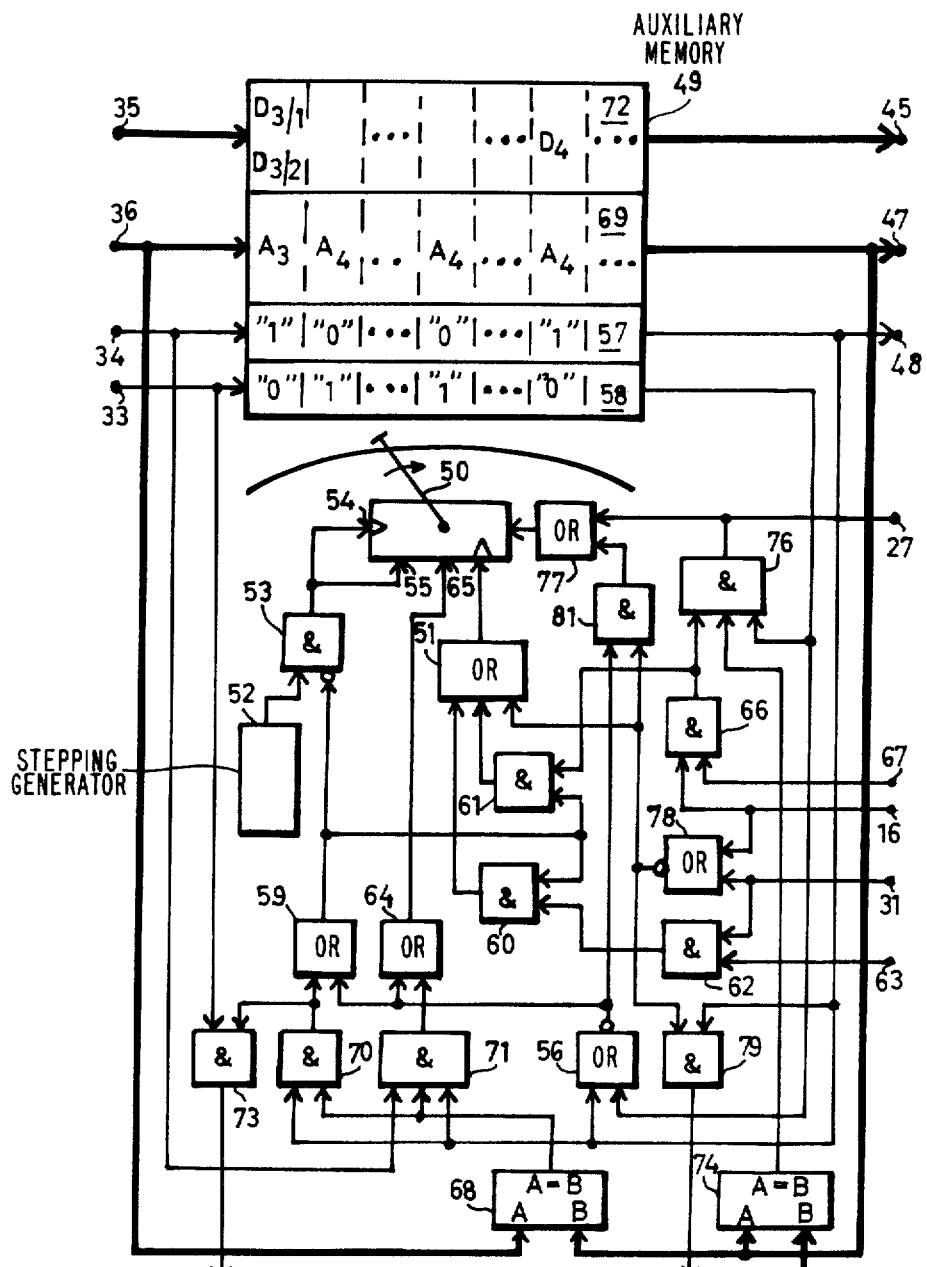
FIG. 3 illustrates an intermediate storage unit included in a data processing unit.

FIG. 3 illustrates an intermediate storage unit which includes an auxiliary memory 49. The latter has columns for intermediately storing data information and read addresses and write addresses, transferred via the terminals 33–36, the columns being selected for writing, reading and erasure with the aid of a scanning device 50. It will be later described how the auxiliary memory is erased when the associated instruction sequence is finally executed.

The front edge of a scanning pulse sent from a fifth OR gate 51 sets the scanning device to zero. Access to the auxiliary memory columns is obtained by the front edges of stepping pulses which are generated by a stepping generator 52 and transferred via an activated stepping AND gate 53 to a stepping terminal 54 of the scanning device. The stepping pulses are also sent to a read activating terminal 55, resulting in that the column contents are read one at a time.

The intermediate storage unit according to FIG. 3 includes a first NOR gate 56, with its inputs adapted for receiving the write markings and read markings intermediately stored in write bit positions 57 and read bit positions 58 of the auxiliary memory, and with its inverting output connected via a stop OR gate 59 to an inverting input of the stepping AND gate 53 and to first inputs of a third and a fourth AND control gate 60 and 61, the outputs of which are connected to the OR gate 51. The control gate 60 has its second input connected to a fifth AND control gate 62, the first input of which is connected to the above-mentioned identifying signal input 31, and the second input of which is connected to the output of the above-mentioned first OR gate 23 via a first control terminal 63.

Consequently, scanning pulses are only generated in the intermediate storage unit included in the data processing unit executing the second sequence. A scanning operation is ordered upon selection of a read instruction or a write instruction. A stop in stepping is obtained when an unoccupied column is read i.e., a column which is neither write marked or read marked. A condition for starting scanning is that the preceding stepping has been stopped.

The first NOR gate 56 is connected via a write OR gate 64 to a write activating input 65 of the scanning device. It is assumed that a write instruction with associated address A3 and data D3/1 as well as a read instruction with associated address A4 constitute the first and second instructions of the second sequence directed towards the main memory, these instructions being intermediately stored in the described way in the first and second columns of the auxiliary memory, these columns having bit positions 57 and 58, which were set to zero prior to respective storage.

The control gate 61 has its second input connected to a sixth AND control gate 66, with the first input connected to the above-mentioned first identifying input 16, and with the second input connected to the bus system write signal line 9 via a first bus terminal 67. A scanning operation is thus also ordered for the second sequence intermediate storage unit upon selecting a write instruction associated with the first sequence. The timing frequency of the stepping generator 52 is assumed to be sufficiently high in relation to the instruction selection speed that all the scanning operations ordered via the control gates 62 and 66 have time to be carried out.

The intermediate storage unit includes a first comparison circuit 68, the output of which is activated upon equality between the address obtained via terminal 36 from the instruction memory 17 and one of the addresses read from the auxiliary memory address bit positions 69 identified during a scanning operation. A seventh AND control gate 70 has its output connected to stop OR gate 59, its first input connected to the output of the first comparison circuit 68 and its second input disposed for receiving the write markings intermediately stored in the auxiliary memory write bit positions 57. Thus, a scanning operation is stopped if a read address or write address selected from the instruction memory agrees with an intermediately stored write address.

The write OR gate 64 has its second input connected to the output of an eight AND control gate 71, the first input of which is connected to the first comparison circuit, its second and third inputs respectively receiving the write markings intermediately stored in the auxiliary memory write bit positions 57 and the write marking selected via the terminal 34 from the instruction memory 17. If a write address e.g., A3, selected from the instruction memory, agrees with an intermediately stored write address, the column in the auxiliary memory where the scan has been stopped due to the selected write address is updated so that, for example, the auxiliary memory first column intermediately stores data information D3/2 in the auxiliary memory data bit positions 72 after updating.

The control gate 70 has its output connected to one input of a ninth AND control gate 73, which has its second input disposed for receiving the read marking selected via terminal 33 from the instruction memory 17, the output of the gate 73 constituting the above-mentioned category signal output 42, which consequently has transferred a binary ZERO to the above-mentioned control gate 41 and gate device 42 in conjunction with intermediately storage of the address A4 in the second column of the auxiliary memory. It is assumed that the selection of the read instruction with associated address A4 is repeated a first time after selection of a number of instructions (not illustrated in FIG. 3) with addresses other than A3 and A4. The selection repeated for the first time does not result in a binary ONE on the category signal output 42 and a scanning stop due to address equality determined by the first comparison circuit 68, so that the read instruction repeated a first time is intermediately stored a second time in a column where bit positions 57 and 58 were previously set to ZERO. The second sequence read instructions with associated address Ax are called "first category instructions" if they are selected before the same address Ax is present in the second sequence in conjunction with the selection of a write instruction. An output 42 set to ZERO identifies a first category instruction.

It is assumed that a write instruction with associated address A4 and data D4 is selected after selection of the above mentioned read instruction repeated for the first time and after selection of a number of instructions (not illustrated in FIG. 3) with addresses other than A3 and A4. There is thus obtained that this write instruction is intermediately stored in a previously unoccupied column. It is further assumed that selection of the read instruction with associated address A4 is repeated a second time after selection of the mentioned write instruction with the address A4. A scanning stop is obtained in conjunction upon reading the intermediately stored write instruction with the address A4. No updating is obtained, i.e. the write marking in the bit position 57 is retained and no read marking is carried out in the bit position 58, and a binary ONE is obtained on the category signal output 42, whereby the read instruction with associated address A4 repeated a second time is identified as a second category instruction. Consequently, the auxiliary memory contains no second category instructions, the selection of which results, however, in that the control gate 41 illustrated in FIG. 2 stops the instruction transfer to the bus system 3 and that the data information, e.g., D4, which is read in conjunction with the associated scanning stop from the auxiliary memory data bit positions 72 is transferred to the data processing unit via the gate devices 43 and 44 illustrated in FIG. 2.

The intermediate storage unit includes a second comparison circuit 74, the output of which is activated on equality between the address obtained from the address bus 8 via a second bus terminal 75 and one of the addresses read from the auxiliary memory address bit positions 69 during a scanning operation. The second comparison circuit is connected to the first input of a tenth AND control gate 76, the second input of which is connected to the above-mentioned control gate 66, its third input receiving the read markings intermediately stored in the auxiliary memory bit positions 58 and its output, constituting the above mentioned restarting signal output 27, being connected to an erase OR gate 77. The OR gate 26 illustrated in FIG. 2 receives a restarting signal from an activated control gate 76. The scanning device 50 receives from an activated erase OR gate 77 an erasure order pulse in response to which all address information intermediately stored in the auxiliary memory is immediately cancelled.

An erasure of the auxiliary memory and a restart of the execution of the second sequence is carried out if an intermediately stored first category read instruction is encountered, where the associated address of this instruction agrees with the address associated with a write instruction which is selected during the execution of the first sequence. The erasure is required since the associated data processing unit has received data information from the main memory, due to the encountered first category instruction, which the memory would not have received if attention had been consistently paid to the order determined in advance, i.e., if instructions in the first and second sequences had not been selected in parallel.

The intermediate storage unit includes a second NOR gate 78 with inputs connected to the above-mentioned identifying signal inputs 16 and 31 and which has its inverting output connected to the OR gate 51. When the selections of the first and the second sequences are terminated, a scanning operation is consequently ordered, although the scanning is without result in the intermediate storage unit included in the data processing unit which has executed the first sequence. The output of the NOR gate 78 is connected to the first input of an eleventh AND control gate 79, the second input of which receives the write markings intermediately stored in the auxiliary memory bit positions 57, the output of gate 79 being connected to the above mentioned gate device 46 via a second control terminal 80. The scanning operation started by the NOR gate 78 results in that all write instructions intermediatestored in the auxiliary memory are transferred, via the terminals 45, 47 and 48, the gate devices 46 and 38, and the bus system 3, to the main memory 1.

Finally, the intermediate storage unit according to FIG. 3 has a twelfth AND control gate 81, with its inputs connected to the NOR gates 56 and 78 and its output connected to erase OR gate 77. There is obtained an erase order pulse when the scanning operation started by NOR gate 78 is terminated.

As an overall effect, there is achieved with the aid of the intermediate storage unit that the first and the second sequences are faultlessy, finally executed in the order determined in advance in spite of the execution of both sequences having been initially ordered to be carried out in parallel.

We claim:

1. A method of operating computer means to enable the computer means to execute a first and second instruction sequence, said computer means comprising auxiliary memory means and a main memory comprising a plurality of main memory locations accessible by an address, said instruction sequences adapted to be executed sequentially in a predetermined order and each instruction sequence comprising at least one instruction, said at least one instruction being selected from at least one read instruction and at least one write instruction, each of said at least one read instruction comprising a read address for retrieval of data stored in one of said main memory locations accessible by said read address, and each of said at least one write instruction comprising data and an associated write address, said write address for specifying one of the main memory locations to which said write instruction data is to be transferred, wherein data used in conjunction with the execution of the second sequence is not necessarily independent of data obtained in conjunction with the execution of the first sequence, said method comprising the steps of:

executing the instructions in both sequences independent of the predetermined order for execution of the sequences;

preventing data transfer to the main memory locations during execution of said first sequence, if said data to be transferred is obtained from the execution of said at least one write instruction of said second sequence;

upon encountering said at least one write instruction during the execution of said second sequence, intermediately storing the write address and data of said at least one write instruction in said auxiliary memory means;

upon encountering the at least one said read instruction during the execution of said second sequence, intermediately storing the read address of said at least one read instruction in said auxiliary memory means, if said read address is not equal to any address which was encountered in conjunction with execution of the at least one write instruction of said second sequence;

comparing each read address encountered during the execution of said second sequence and the intermediately stored write address and generating a first signal when said compared read address is equal to one of the intermediately stored write addresses;

preventing, upon receiving said first signal, reading of the data from the main memory location accessible by said compared read address and instead reading from said auxiliary memory means the intermediately stored data associated with said write address;

comparing the write address of the at least one write instruction encountered during execution of said first sequence to the intermediately stored read addresses and generating a second signal when one of said compared write addresses is equal to one of the intermediately stored read addresses;

reexecuting the at least one instruction of said second sequence responsive to generation of said second signal; and transferring, responsive to termination of the execution of said first sequence, any intermediately stored data into the main memory locations accessible by the associated intermediately stored write addresses.

2. An apparatus for executing a first and second instruction sequence, said instruction sequences adapted to be executed sequentially in a predetermined order, said first sequence being logically executable before said second sequence, each of said sequences comprising at least one instruction, wherein data used in conjunction with the execution of said second sequence is not necessarily independent of data obtained in conjunction with the execution of said first sequence, said apparatus comprising:

a first starting circuit for starting execution of said at least one instruction in said first sequence;

first and second instruction memory means for storing said first and second instruction sequences, respectively, and for addressing the stored instructions one at a time, said stored instructions comprising at least one read instruction and at least one write instruction;

main memory means connected to said first and second instruction memory means via a bus system, and having at least one memory location for storing data to be read and written using read/write addresses selected from read/write address bit positions in the first and second instruction memory means;

a second starting circuit for starting execution of said at least one instruction in said second sequence, said second starting circuit having a first activating input connected to said first starting circuit and a second activating input;

a first instruction transfer circuit comprising an input connected to said second instruction memory means, an output connected to said bus system and means for deactivating said first instruction transfer circuit during execution of said at least one instruction in said first sequence when one of said at least one write instruction is encountered during execution of said second sequence;

auxiliary memory means comprising an input connected to said second instruction memory means, data bit positions and write address bit positions for intermediately storing a write address and associated data of said at least one write instruction encountered during the execution of said second sequence, read address bit positions, means for identifying memory addresses accessed by the at least one write instruction of said second sequence, first means for determining whether memory addresses have previously been selected by the execution of one of the at least one write instruction of said second sequence, and storing means responsive to said determining means for intermediately storing an address of said at least one read instruction encountered during execution of said second sequence when said address is not one of the memory addresses determined to have been encountered by the execution of the at least one write instruction of said second sequence;

first comparing means for comparing two addresses, said first comparing means comprising at least one first comparison terminal connected to the read address bit positions of said second instruction memory means for receiving the read addresses of said at least one instruction of said second sequence, at least one second comparison terminal connected to write address bit positions of said auxiliary memory means for receiving the write addresses of said at least one instruction of said second sequence stored therein, and an output for outputting a first logical switching signal when said read address received at said at least one first comparison terminal is not equal to one of said write addresses received at said at least one second comparison terminal, and for outputting a second logical switching signal when said read address received at said at least one first comparison terminal is equal to one of said write addresses received at said at least one second comparison terminal;

a data switch comprising a first data input connected to said bus system, a second data input connected to the data bit positions of said auxiliary memory and a control input connected to said output of said first comparing means, for retrieving, responsive to said first switching signal, data from the main memory location which is accessible by the read address received by said first comparing circuit, and for retrieving from said auxiliary memory responsive to said second switching signal, data associated with each of the write addresses received by said first comparing means;

second comparing means having at least one first comparison terminal for receiving the write addresses encountered during the execution of said first sequence, at least one second comparison terminal connected to said read address bit positions of said auxiliary memory means and an output connected to said second activating input of said second starting circuit, said output adapted to output a signal when one address received on said at least one first comparison terminal is equal to one of the addresses received on said at least one second comparison terminal and second means for determining whether the execution of said first sequence has terminated; and a second instruction transfer circuit comprising an input connected to said data bit positions and to said write address bit positions of said auxiliary memory means and an output connected to said bus system and which is activated upon termination of the execution of said first sequence for transferring any write instructions intermediately stored in said auxiliary memory means to said main memory means.

* * * * *